(12) United States Patent
Alner (10) Patent No.: US 10,717,455 B2
(45) Date of Patent: Jul. 21, 2020

(54) PAIR OF GRIPS FOR TIPPABLE APPARATUS

(71) Applicant: ITIP Handles Limited, London (GB)

(72) Inventor: David Lee Alner, St. Albans (GB)

(73) Assignee: David Lee Alner, St. Albans (GB)

( * ) Notice: Subject to any disclaimer, the term of this patent is extended or adjusted under 35 U.S.C. 154(b) by 0 days.

(21) Appl. No.: 16/338,170

(22) PCT Filed: Oct. 20, 2017

(86) PCT No.: PCT/GB2017/000155
§ 371 (c)(1),
(2) Date: Mar. 29, 2019

(87) PCT Pub. No.: WO2018/078310
PCT Pub. Date: May 3, 2018

(65) Prior Publication Data
US 2019/0270473 A1    Sep. 5, 2019

(30) Foreign Application Priority Data

Oct. 24, 2016 (GB) .................................. 1617921.0

(51) Int. Cl.
*B25G 1/00* (2006.01)
*B62B 5/06* (2006.01)
*B62B 1/18* (2006.01)

(52) U.S. Cl.
CPC ............... *B62B 5/066* (2013.01); *B62B 1/18* (2013.01); *B62B 5/06* (2013.01)

(58) Field of Classification Search
CPC . Y10T 16/4713; Y10T 16/469; Y10T 16/476; B62B 5/066; B62B 5/06;
(Continued)

(56) References Cited

U.S. PATENT DOCUMENTS 267,837 A    11/1882    Clark
1,516,856 A *  11/1924  Johnson ................. B62B 5/068
                                                        280/1.5

(Continued)

FOREIGN PATENT DOCUMENTS

AU          2005100716 A4 *  11/2005
WO    WO 2006/040547 A1      4/2006

*Primary Examiner* — Chuck Y Mah
(74) *Attorney, Agent, or Firm* — Iandiorio Teska & Coleman, LLP (57) ABSTRACT

A pair of grips (2) for tippable apparatus (4) comprising at least one wheel (6), a body portion (8) for receiving a load (10), and a pair of handles (12) by which the tippable apparatus (4) is able to be pushed and tipped about the wheel (6), and the pair of grips (2) being such that each grip (2) comprises: (i) a connecting portion (14) for connecting to one of the handles; (ii) a hand grip portion (16); (iii) at least one guide slot (18) in the hand grip portion (16); and (iv) at least one slide portion (20) which extends from the connecting portion (14) and into the guide slot (18), and the grip (2) being such that: (v) the guide slot (18) is curved, and (vi) the slide portion (20) is retained in the guide slot (18) and is slideable backwards and forwards in the guide slot (18) in order to allow the tipping of the tippable apparatus (4) about the wheel (6) and without a person having to change their hand position on the grip (2).

17 Claims, 8 Drawing Sheets

(58) Field of Classification Search
CPC .......... B62B 5/063; B62B 5/064; B62B 1/18; B62B 1/24
See application file for complete search history.

(56) References Cited

U.S. PATENT DOCUMENTS

| | | | |
|---|---|---|---|
| 2,901,263 A | | 8/1959 | Van Loon, Jr. |
| 3,173,705 A | * | 3/1965 | Du Puy .................... B62B 5/06 280/47.31 |
| 4,951,965 A | * | 8/1990 | Brown ................. B60R 22/024 280/801.1 |
| 5,153,966 A | * | 10/1992 | Godwin ................... B62B 5/06 16/421 |
| D362,100 S | * | 9/1995 | McMurdo .................... D12/179 |
| 5,799,960 A | * | 9/1998 | Davis, Sr. ................. B62B 5/06 280/47.31 |
| 6,125,512 A | * | 10/2000 | Weber ...................... B62B 5/06 16/421 |
| 6,550,104 B2 | * | 4/2003 | Cacciacarne ............ B62B 5/06 16/426 |
| 7,121,565 B2 | * | 10/2006 | Lulay ...................... B62B 5/06 280/47.315 |
| 7,658,390 B2 | * | 2/2010 | Martin ..................... B62B 5/06 16/422 |
| 7,866,686 B2 | * | 1/2011 | Conaway ................ B62B 1/208 280/47.31 |
| 2008/0121065 A1 | | 5/2008 | Yanai et al. |
| 2015/0054241 A1 | | 2/2015 | Wierszewski |
| 2015/0183451 A1 | | 7/2015 | Stierli |
| 2019/0308653 A1 | * | 10/2019 | Carlos ...................... B62B 1/18 |

\* cited by examiner

PAIR OF GRIPS FOR TIPPABLE APPARATUS

This invention relates to a pair of grips for tippable apparatus such for example as a wheelbarrow.

Grips for tippable apparatus such for example as a wheelbarrow are known. Often the known grips are awkward to operate and/or are complex in design.

It is an aim of the present invention to provide a pair of improved grips.

Accordingly, in one non-limiting embodiment of the present invention there is provided pair of grips for tippable apparatus comprising at least one wheel, a body portion for receiving a load, and a pair of handles by which the tippable apparatus is able to be pushed and tipped about the wheel, and the pair of grips being such that each grip comprises:
   (i) a connecting portion for connecting to one of the handles;
   (ii) a hand grip portion;
   (iii) at least one guide slot in the hand grip portion; and
   (iv) at least one slide portion which extends from the connecting portion and into the guide slot,
and the grip being such that:
   (v) the guide slot is curved, and
   (vi) the slide portion is retained in the guide slot and is slideable backwards and forwards in the guide slot in order to allow the tipping of the tippable apparatus about the wheel and without a person having to change their hand position on the grip.

The grip is easy to use in that a person simply needs to hold the hand grip portion, and then the slide portion automatically slides around the guide slot to a required position in dependence upon the position of the handles of the tippable apparatus with respect to the wheel of the tippable apparatus. In addition, the grip is easily manufactured, for example moulded from a mouldable plastics material.

The connecting portion may connect to the handle such that the connecting portion is axially in line with the handle. If desired however the connecting portion may connect to the handle such that the connecting portion is off-set with respect to the handle.

The connecting portion may be a tube for fitting over an end of the handle. In this case, the connecting portion may include securing means for securing the connecting portion to the handle. The securing means may be a twist-grip securing means. The twist-grip securing means may comprise a sleeve which is twisted one way for tightening and the opposite way for loosening, and in which the sleeve forms at least a part of the hand grip portion. Other types of securing means may be employed so that, for example, the securing means may be a screw or a bolt which extends through the connecting portion and engages with the handle. The screw or bolt may be a friction fit to the handle but it may alternatively extend into a threaded bore in the handle if desired. Other types of securing means than a twist-grip securing means or a screw or bolt may be employed.

Alternatively, the connecting portion may be a male formation which extends into the end of the handle. In this case, the handle may be in the form of a hollow tube. The male formation may be expandable such as to be able to be expanded in the end of the handle and thereby be retained in the end of the handle. The male formation may have expandable fingers which are expandable outwardly to engage the inside of the end of the handle. Other types of expandable formation may be employed.

When the connecting portion is a male formation which extends into the end of the handle, then the male formation may be secured in position by appropriate securing means, for example a screw or a bolt passing through the handle and engaging the male formation.

Preferably, the hand grip portion is D-shaped. Other shapes for the hand grip portion may be employed.

Preferably, the guide slot is part circular. In this case, the guide slot is preferably one half of a circle. The guide slot may be more or less than one half of a circle. Other formations for the guide slot may be employed.

The slide portion may comprise a curved formation which has a curve which is complementary to the curve of the guide slot. Other shapes for the slide portion may be employed.

The pair of grips may be one in which there is one of the guide slots and one of the slide portions, and in which the slide portion is positioned on a neck formation extending between the slide portion and one end of the connecting portion. The guide slot may have a pair of inwardly extending lips which act to retain the slide portion in the guide slot.

The pair of grips may alternatively be one in which there are two of the guide slots and two of the slide portions, in which there is one of the guide slots on opposite sides of the hand grip portion, and in which the slide portions are formed by a C-shaped aperture in one end of the connecting portion. The aperture may be a re-entrant aperture with a mouth which is defined by the two slide portions facing each other and being spaced apart from each other.

The present invention also extends to tippable apparatus which comprises at least one wheel, a body portion for receiving a load, and a pair of handles by which the tippable apparatus is able to be pushed and tipped about the wheel, and the tippable apparatus being characterised in that it includes a pair of handles of the invention.

The tippable apparatus may be in the form of a wheelbarrow, wheelchair, hand truck or hand trolley. Other types of tippable apparatus may be employed. The load received by the body portion will depend upon the type of tippable apparatus. Thus, for example, the load may be rubbish if the tippable apparatus is a wheelbarrow. The load may be a person if the tippable apparatus is a wheelchair. The load may be goods in a warehouse if the tippable apparatus is in the form of a hand truck or hand trolley.

Embodiments of the invention will now be described solely by way of example and with reference to the accompanying drawings in which.

Referring to FIGS. 1-6, there is shown a first grip 2 which forms one of a pair of substantially identical grips 2 for tippable apparatus 4. The tippable apparatus 4 comprises at least one wheel 6, a body portion 8 for receiving a load 10, and a pair of handles 12 by which the tippable apparatus 4 is able to be pushed and tipped about the wheel 6.

The grip 2 comprises a connecting portion 14 for connecting to one of the handles 12. The grip 2 also comprises a hand grip portion 16 and a guide slot 18 in the hand grip 16 portion. The grip 2 further comprises a slide portion 20 which is on the connecting portion 14 and which locates in the guide slot 18.

The grip 2 is such that the guide slot 18 is curved. The slide portion 20 is retained in the guide slot 18. The slide portion 20 is slidable backwards and forwards in the guide slot 18 in order to allow the tipping of the tippable apparatus 4 about the wheel 6 and without a person (not shown) having to change their hand position on the grip 2.

Figure 1:
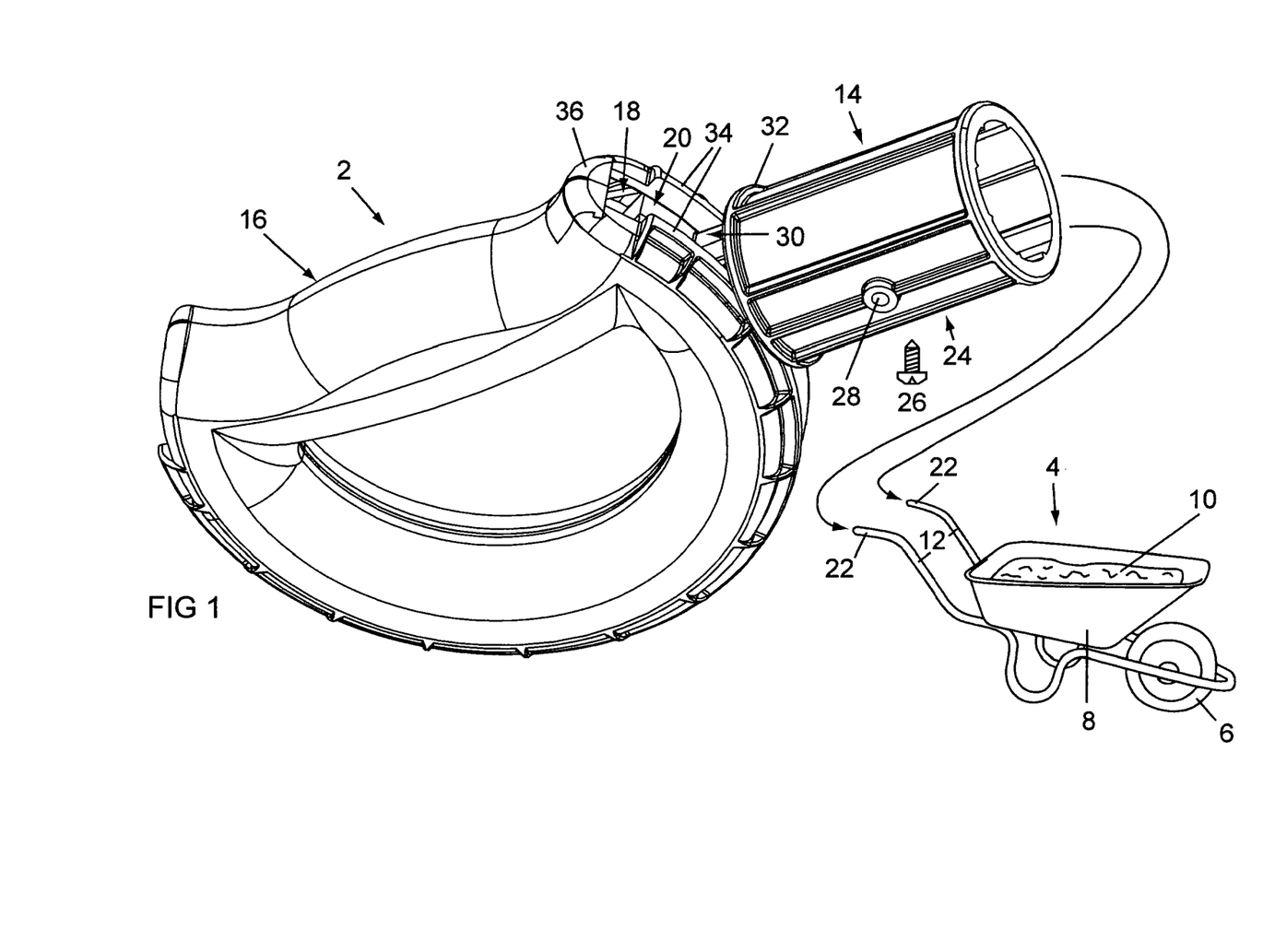
FIG. 1 shows a right or left hand one of a first pair of grips for tippable apparatus in the form of a wheelbarrow, with FIG. 1 also showing how the grip fits on a handle of the wheelbarrow.
Figure 2:
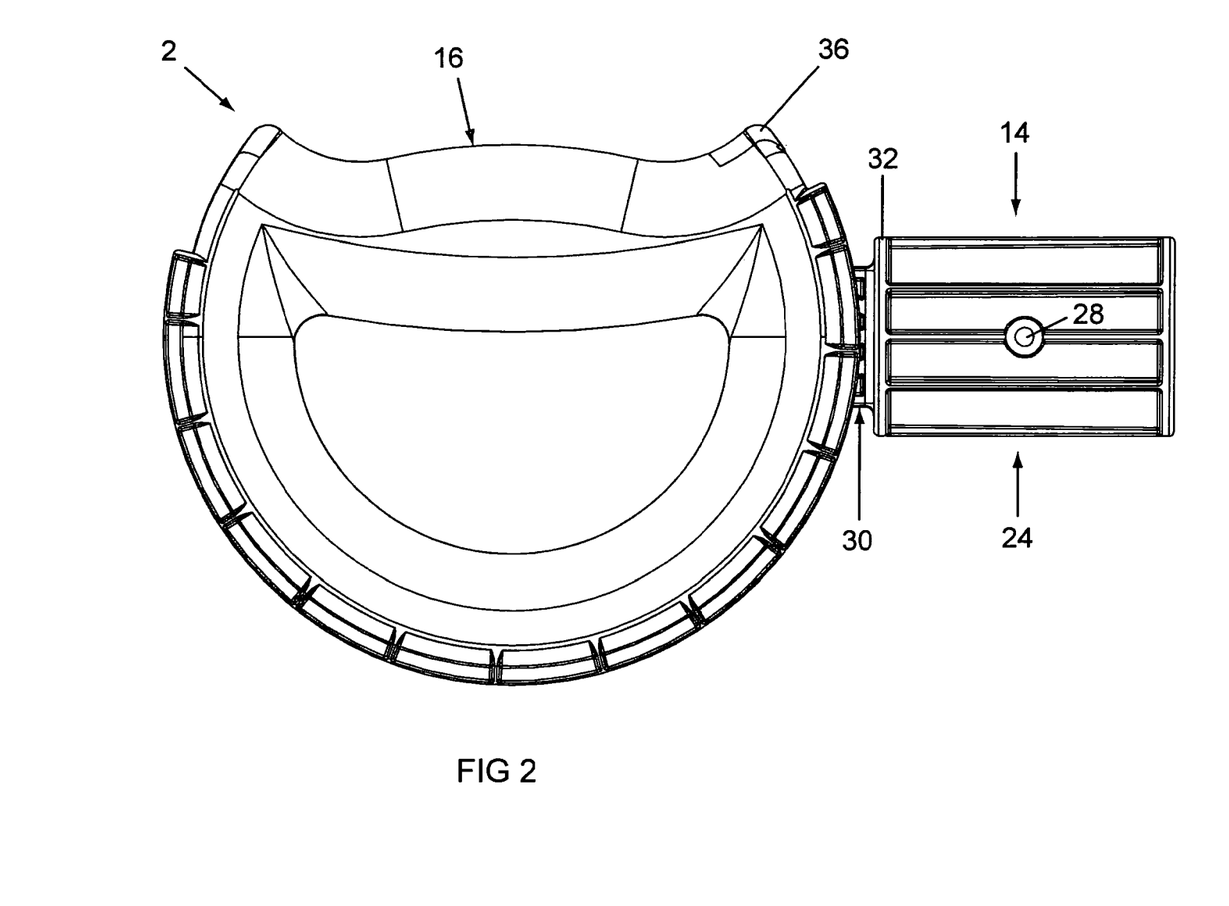
FIG. 2 is a side view of the grip shown in FIG. 1.

The connecting portion 14 connects to the handle 12 such that the connecting portion 14 is axially in line with the handle. The connecting portion 14 is in the form of a tube which fits over an end 22 of the handle 12 as shown in FIG. 1.

Figure 3:
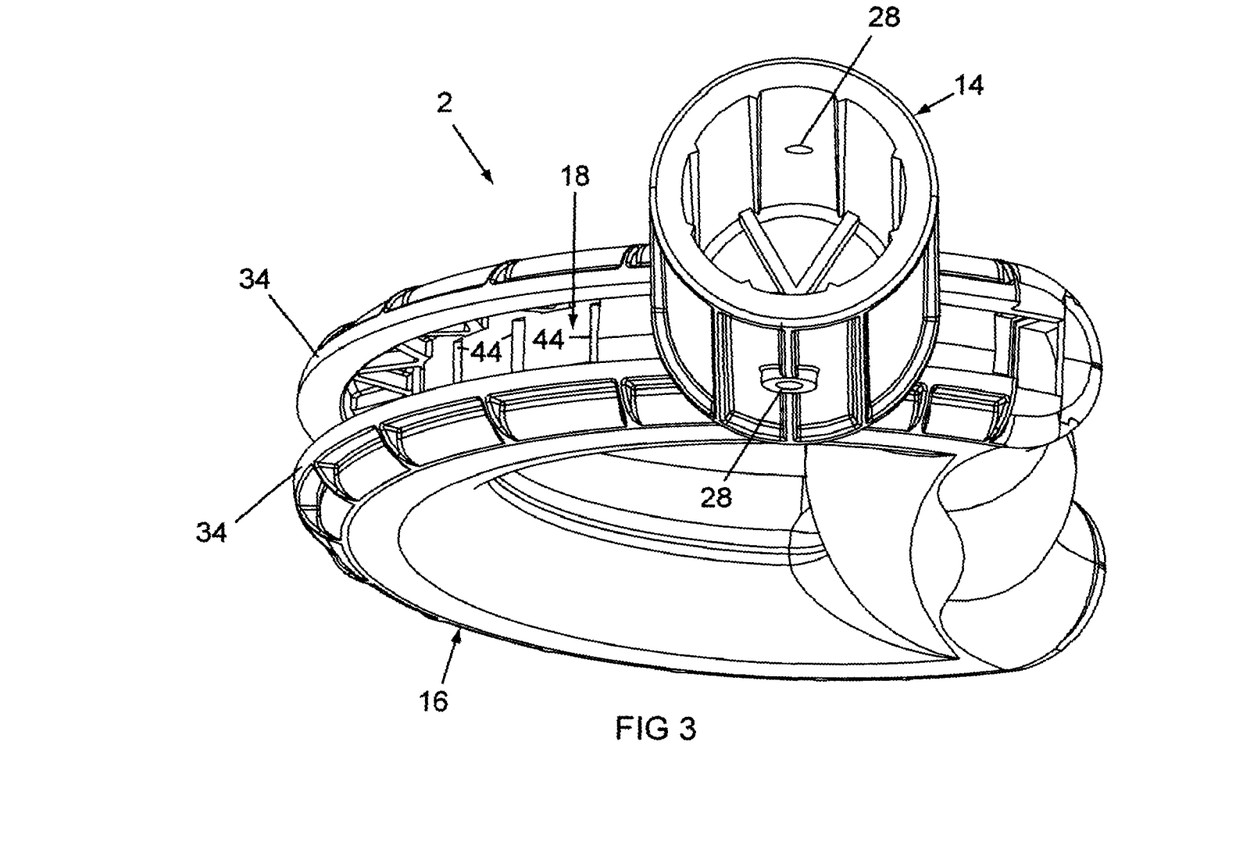
FIG. 3 is a perspective view from one end and one side of the grip as shown in FIG. 1.
Figure 4:
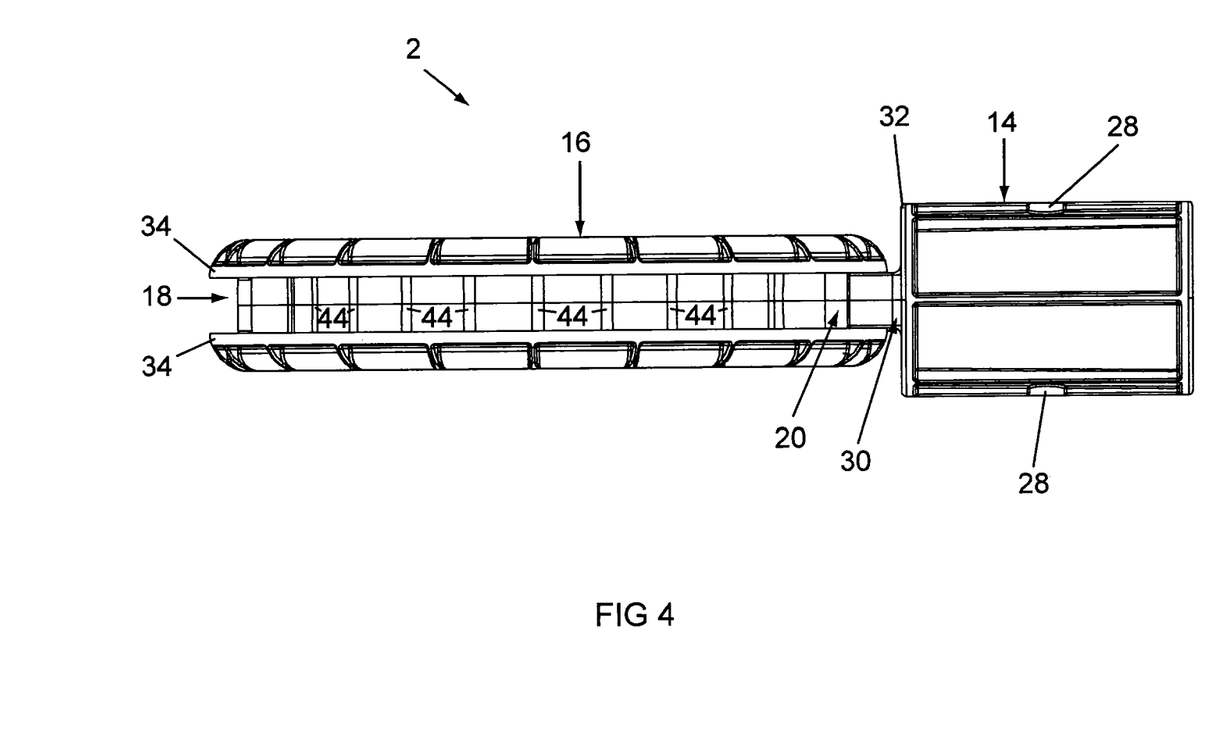
FIG. 4 is an underneath view of the grip as shown in FIG. 2.

The grip 2 includes securing means 24 for securing the connecting portion 14 to the handle 12. The securing means 24 comprises a threaded screw 26 which extends through an aperture 28 in the connecting portion 14 and engages by friction on the handle 12. As shown in FIGS. 3 and 4, the connecting portion 14 is provided with two of the apertures 28, there being one of the apertures 28 on each side of the connecting portion 14. This enables the connecting portion 14 easily to be secured in position from the outside of either handle 12 of the tippable apparatus 4.

The hand grip portion 16 is D-shaped. The guide slot 18 is part circular and, more especially, the guide slot is one half of a circle.

The slide portion 20 is a curved male formation which has a curve which is complementary to the curve of the guide slot 18.

The slide portion 20 is on a neck formation 30 extending between the slide portion 20 and one end 32 of the connecting portion 14.

As best appreciated from FIGS. 1, 3 and 4, the guide slot 18 has a pair of inwardly extending lips 34 which retain the slide portion 20 in position in the guide slot 18, and such that the slide portion 20 is able to slide along the guide slot 18. During manufacture, the guide slot 18 is open at one end in order to receive the slide portion 20. The open end of the guide slot 18 is then closed by a stop member 36.

Figure 5:
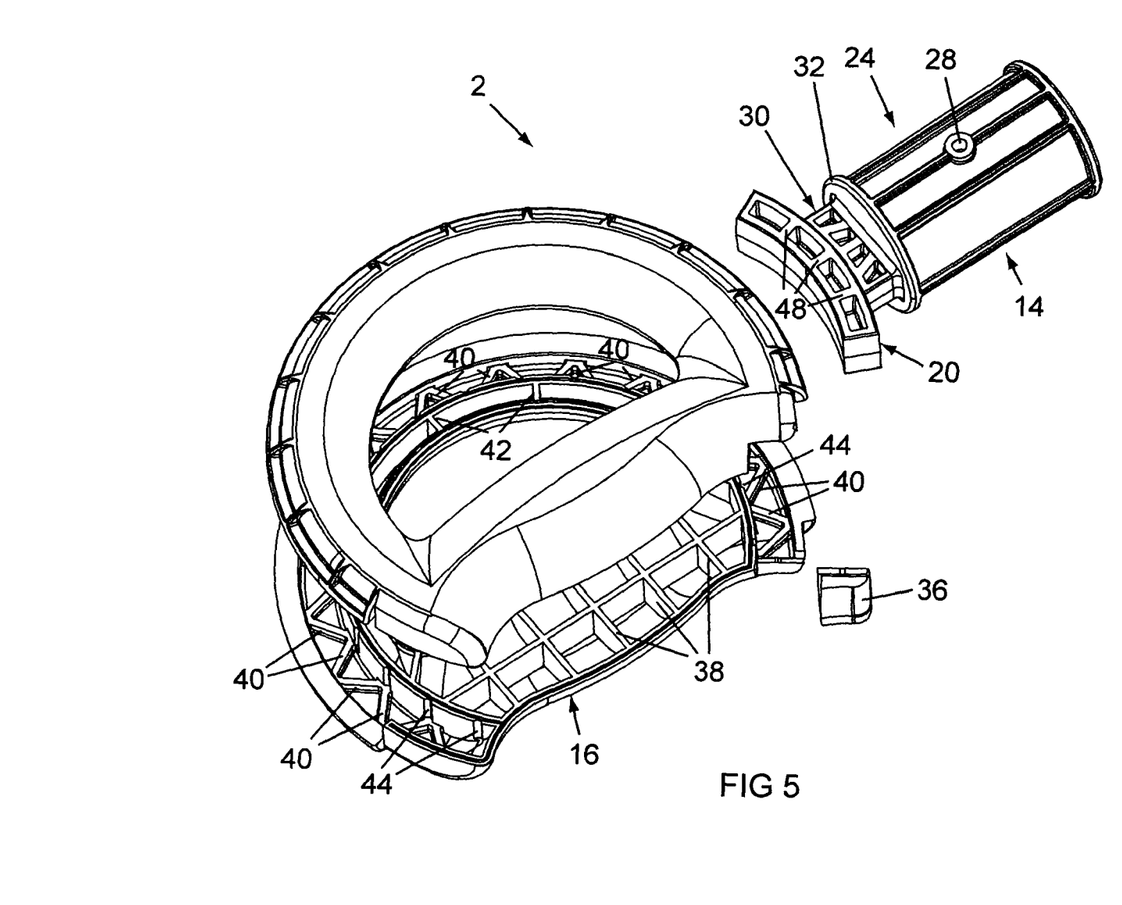
FIG. 5 is an exploded view of the grip as shown in FIG. 1 and rotated through 90°.
Figure 6:
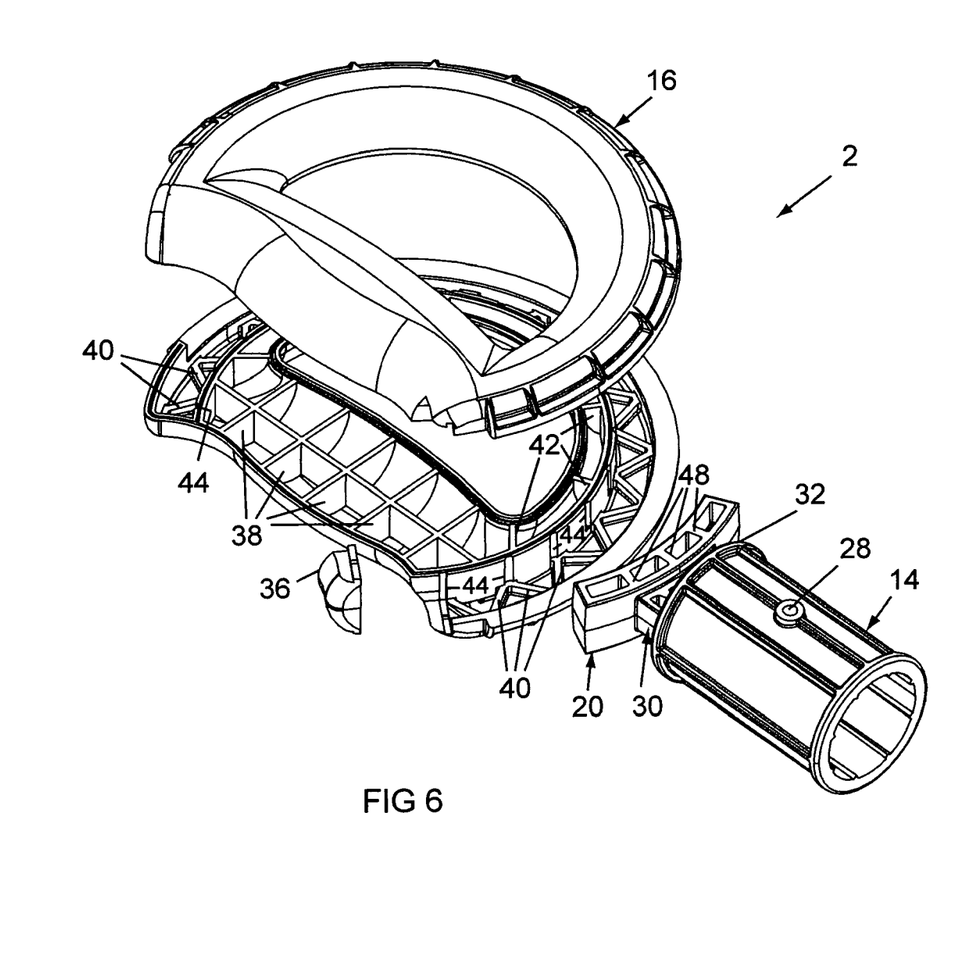
FIG. 6 is an exploded view like FIG. 1 but from a different angle.
Figures 7, 8:
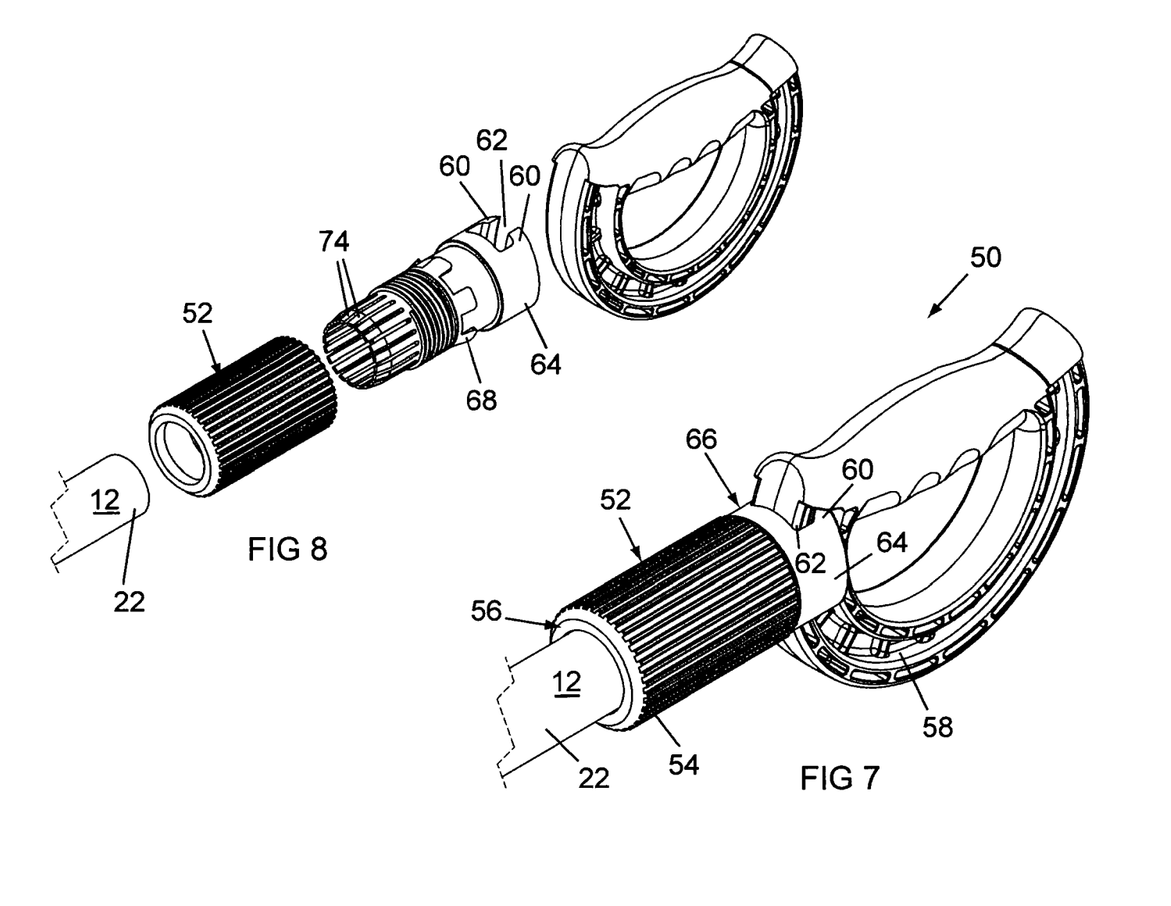
FIG. 7 is a perspective view of a right or left hand one of a second pair of grips for tippable apparatus in the form of a wheelbarrow, with FIG. 7 showing the grip fitted on a handle of the wheelbarrow.
FIG. 8 is an exploded view of the grip as shown in FIG. 7.
Figures 9, 10, 12:
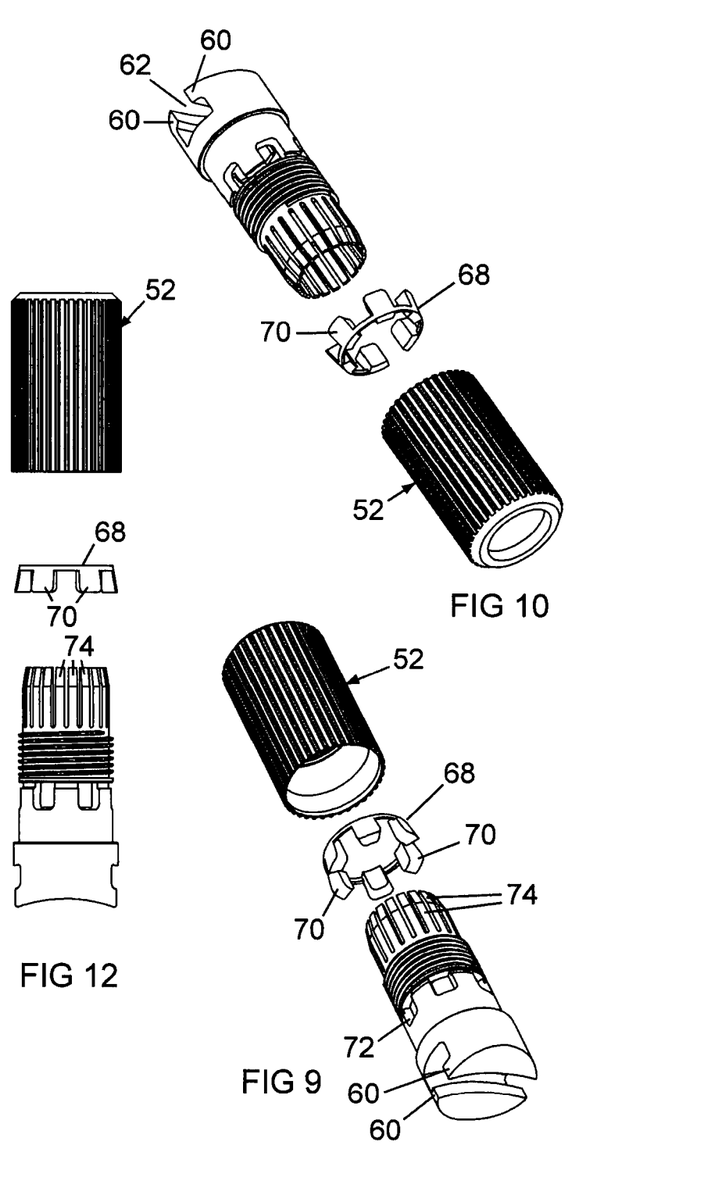
FIG. 9 is an exploded view from one end of twist-grip securing means forming part of the grip shown in FIG. 7.
FIG. 10 is an exploded view like FIG. 9 but from the other end of the twist-grip securing means.
FIG. 12 is a view like FIG. 11 but illustrates the castellations moving with respect to their slots.
Figure 11:
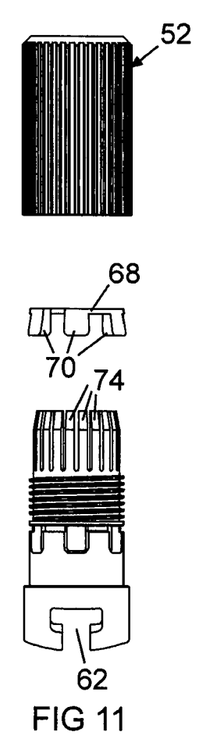
FIG. 11 is a side view of the twist-grip securing means and illustrates the position of castellations in slots.

The grip 2 is easily manufactured by moulding from an appropriate mouldable plastics material. FIGS. 5 and 6 illustrate how the moulding is able to be provided with internal walls 38, 40, 42. These walls enable the hand grip 16 to be produced rigidly but with the minimum of plastics material. FIGS. 3, 4, 5 and 6 show how the hand grip 16 is able to be provided with grooves 44. The grooves 44 are able to hold lubricant for facilitating a good sliding action of the slide portion 20 and the guide slot 18. The grooves 44 are also available for catching any unwanted debris that may get into the grip 2.

The grip 2 may be moulded in two halves, as best appreciated from FIGS. 5 and 6. The two halves are then able to be connected together, for example by screws passing through appropriately located apertures (not shown) in one half of the grip 2 and screwing into the other half of the grip 2. The moulding of the grip 2 in the two halves enables the formation of the guide slot 18. As can be appreciated from FIGS. 4 and 5, the connecting portion 14 is made in one piece. As shown in FIGS. 5 and 6, the slide portion 20 has internal walls 48 which enable the slide portion 20 to be produced from a minimum of mouldable material but with the required rigidity and strength.

Referring now to FIGS. 7-12, there is shown a second grip 50 attached to one end 22 of a handle 12 of tippable apparatus 4. The grip 50 includes securing means 52 which is a twist-grip securing means 52. The twist-grip securing means 52 comprises a sleeve 54 which is twisted one way for tightening, and which is twisted the opposite way for loosening. The sleeve 54 forms a part of a handgrip portion 56 of the grip 50.

The grip 50 is such that there are two guide slots 58 and two slide portions 60. There is one of the guide slots 58 on opposite sides of the handgrip portion 56. The slide portions 60 are formed by a C-shaped aperture 62 in one end 64 of the connecting portion 66. The slide portions 60 face each other and define the mouth of the slot. The slide portions 60 may have curved surfaces which are complementary to curved surfaces forming the walls of the guide slot 58. Alternatively, the slide slot portions 60 may be defined by straight walls.

When the sleeve 54 is rotated, it rotates relative to the end 22 of the handle 12. The rotation causes movement of the castellated ring 68 which has castellations 70 received in slots 72. The relative movement between the illustrated parts causes gripping fingers 74 to close for tightening purposes, and to open for unfastening purposes. When in their gripping position, the gripping fingers 74 grip the outside of the end 22 of the handle 12. Securing to and removal of the grip 50 to the handle 12 is thus effected by a simple rotational movement of the sleeve 54.

The tippable apparatus 4 is shown in the form of a wheelbarrow. The tippable apparatus 4 may be another type of tippable apparatus such for example as a wheelchair, a hand truck or a hand trolley.

It is to be appreciated that the embodiments of the invention described above with reference to the accompanying drawings have been given by way of example only and that modifications may be effected. Thus, for example, instead of the connecting portion 14 being a tube which fits over the end 22 of the handle 12, the connecting portion 14 could be a male formation which extends into the end 22 of the handle 12 and which is then expanded in order to become a friction grip inside the end 22 of the handle 12. The hand grip portion 16 may be of other shapes. The guide slot 18 may extend for more or less than one half of a circle. The tippable apparatus 4 may include more than one wheel, for example in dependence upon the type of tippable apparatus. There may be one or two wheels at the front of the tippable apparatus when the tippable apparatus is in the form of a wheelbarrow. For tippable apparatus, for example wheelbarrows, with handles of different sizes, the hand grips may be made in one size and shims or other spacer members used as required to take up space between the handles and the hand grips. The pair of hand grips may be manufactured and sold for retrofitting to existing tippable apparatus. Alternatively, if desired, tippable apparatus as manufactured may be provided with the pair of hand grips at the time of manufacture. The tippable apparatus may be without wheels, for example in the form of a stretcher. Individual components shown in the drawings are not limited to use in their drawings and they may be used in other drawings and in all aspects of the invention. The invention also extends to the individual components mentioned and/or shown above, taken singly or in any combination.

The invention claimed is:

1. A pair of grips for tippable apparatus comprising at least one wheel, a body portion for receiving a load, and a pair of handles by which the tippable apparatus is able to be pushed and tipped about the wheel, and the pair of grips being such that each grip comprises:
   (i) a connecting portion for connecting to one of the handles;
   (ii) a hand grip portion;
   (iii) at least one guide slot in the hand grip portion; and
   (iv) at least one slide portion which extends from the connecting portion and into the guide slot,
and the grip being such that:
   (v) the guide slot is curved, and
   (vi) the slide portion is retained in the guide slot and is slideable backwards and forwards in the guide slot in order to allow the tipping of the tippable apparatus about the wheel and without a person having to change their hand position on the grip.

2. A pair of grips according to claim 1 in which the connecting portion connects to the handle such that the connecting portion is axially in line with the handle.

3. A pair of grips according to claim 1 in which the connecting portion is a tube for fitting over an end of the handle.

4. A pair of grips according to claim 3 and including securing means for securing the connecting portion to the handle.

5. A pair of grips according to claim 4 in which the securing means is a twist-grip securing means.

6. A pair of grips according to claim 5 in which the twist-grip securing means comprises a sleeve which is twisted one way for tightening and the opposite way for loosening, and in which the sleeve forms at least a part of the hand grip portion.

7. A pair of grips according to claim 1 in which the connecting portion is a male formation which extends into the end of the handle.

8. A pair of grips according to claim 7 in which the male formation is expandable such as to be able to be expanded in the end of the handle and thereby be retained in the end of the handle.

9. A pair of grips according to claim 1 in which the hand grip portion is D-shaped.

10. A pair of grips according to claim 1 in which the guide slot is part circular.

11. A hand grip according to claim 10 in which the guide slot is one half of a circle.

12. A pair of hand grips according to claim 1 in which the slide portion comprises a curved formation which has a curve which is complementary to the curve of the guide slot.

13. A pair of grips according to claim 1 in which there is one of the guide slots, and in which the slide portion is positioned on a neck formation extending between the slide portion and one end of the connecting portion.

14. A pair of grips according to claim 13 in which the guide slot has a pair of inwardly extending lips which act to retain the slide portion in the guide slot.

15. A pair of grips according to claim 1 in which there are two of the guide slots and two of the slide portions, in which there is one of the guide slots on opposite sides of the hand grip portion, and in which the slide portions are formed by a C-shaped aperture in one end of the connecting portion.

16. Tippable apparatus which comprises at least one wheel, a body portion for receiving a load, and a pair of handles by which the tippable apparatus is able to be pushed and tipped about the wheel, and the tippable apparatus being characterised in that it comprises a pair of hand grips according to claim 1.

17. Tippable apparatus according to claim 16 and in the form of a wheelbarrow, wheelchair, hand truck or hand trolley.

* * * * *